United States Patent
Beutin et al.

(10) Patent No.: US 10,400,632 B2
(45) Date of Patent: Sep. 3, 2019

(54) UNDUCTED PROPELLER TURBOSHAFT ENGINE PROVIDED WITH A REINFORCING SHELL INTEGRATING PIPE SEGMENTS

(71) Applicant: SAFRAN AIRCRAFT ENGINES, Paris (FR)

(72) Inventors: Bruno Albert Beutin, Evry (FR); Nuria Llamas Castro, Savigny sur Orge (FR); Maria Natal, Paris (FR); Bruna Ramos, Seine Port (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 401 days.

(21) Appl. No.: 15/113,683

(22) PCT Filed: Jan. 14, 2015

(86) PCT No.: PCT/FR2015/050084
§ 371 (c)(1),
(2) Date: Jul. 22, 2016

(87) PCT Pub. No.: WO2015/110741
PCT Pub. Date: Jul. 30, 2015

(65) Prior Publication Data
US 2017/0002688 A1 Jan. 5, 2017

(30) Foreign Application Priority Data
Jan. 23, 2014 (FR) ...................................... 14 50556

(51) Int. Cl.
*F01D 25/26* (2006.01)
*F01D 25/24* (2006.01)
(Continued)

(52) U.S. Cl.
CPC ............. *F01D 25/26* (2013.01); *B64D 27/16* (2013.01); *F01D 25/12* (2013.01); *F01D 25/24* (2013.01);
(Continued)

(58) Field of Classification Search
CPC .......... F01D 25/26; F01D 25/24; F01D 25/14; F01D 1/24; F01D 1/26; F01D 1/28;
(Continued)

(56) References Cited

U.S. PATENT DOCUMENTS 4,502,276 A    3/1985   Pask
5,079,916 A *   1/1992   Johnson .................. B64C 11/48
                                                                           416/129
(Continued)

FOREIGN PATENT DOCUMENTS

FR    2 981 686 A1   4/2013
GB    2 114 661 A    8/1983
(Continued)

OTHER PUBLICATIONS

International Search Report and Written Opinion dated Jun. 25, 2015 in PCT/US2015/023517.
(Continued)

*Primary Examiner* — Justin D Seabe
*Assistant Examiner* — Sabbir Hasan
(74) *Attorney, Agent, or Firm* — Oblon, McClelland, Maier & Neustadt, L.L.P.

(57) ABSTRACT

An airplane unducted propeller turboshaft engine having a gas generator and a receiver including a propulsion assembly carrying least one propeller, the engine including a first casing, a second casing, and a third casing, the third casing being provided between the first and second casings and surrounding at least a portion of the gas generator, a reinforcing shell presenting a first attachment zone mounted on
(Continued)

the first casing, second attachment zone mounted on the second casing, and a wall provided between the first and second attachment zones and surrounding the third casing, wherein the reinforcing shell further includes at least one pipe segment integrated in the wall.

9 Claims, 2 Drawing Sheets

(51) Int. Cl.
*F02K 3/072* (2006.01)
*F02C 7/20* (2006.01)
*B64D 27/16* (2006.01)
*F01D 25/12* (2006.01)
*B64D 27/00* (2006.01)

(52) U.S. Cl.
CPC ............... *F02C 7/20* (2013.01); *F02K 3/072* (2013.01); *B64D 2027/005* (2013.01); *F05D 2220/323* (2013.01); *F05D 2240/14* (2013.01); *F05D 2240/30* (2013.01); *Y02T 50/672* (2013.01)

(58) Field of Classification Search
CPC . F01D 15/12; B64D 27/16; F02C 7/20; F02C 3/067; F02K 3/072
See application file for complete search history.

(56) References Cited

U.S. PATENT DOCUMENTS

| | | | |
|---|---|---|---|
| 5,275,532 A | | 1/1994 | Mazeaud et al. |
| 8,807,477 B2* | | 8/2014 | Suciu ................... B64D 27/26 244/53 R |
| 9,217,391 B2* | | 12/2015 | Gallet ..................... F02K 3/062 |
| 2005/0228995 A1 | | 10/2005 | Kwak et al. |
| 2009/0067625 A1 | | 3/2009 | Patel et al. |
| 2011/0122142 A1 | | 5/2011 | Wyatt et al. |
| 2012/0063376 A1 | | 3/2012 | Kambhatla et al. |
| 2013/0038508 A1 | | 2/2013 | Min |
| 2013/0098066 A1 | | 4/2013 | Gallet et al. |
| 2013/0279693 A1 | | 10/2013 | Rothschild |

FOREIGN PATENT DOCUMENTS

| | | |
|---|---|---|
| GB | 2 174 762 A | 11/1986 |
| GB | 2 260 786 A | 4/1993 |

OTHER PUBLICATIONS

High-bandwidth Digital Content Protection System, Mapping HDCP to HDMI, Revision 2.2, Feb. 2013, 72 pages.
Alan Kobayashi "DisplayPort™ Ver.1.2 Overview", [online], Dec. 6, 2010, DisplayPort, Developer Conference, [retrieved on Sep. 27, 2016], Internet (URL:http://www.vesa.org/wp-content/uploads/2010/12/DisplayPoti-DevCon-Presentation-DP-1.2-Dec-2010-rev-2b.pdf#search='Displayport+1.2+overview'), 34 pages.
International Search Report dated Apr. 29, 2015, in PCT/FR2015/050084 Filed Jan. 14, 2015.

* cited by examiner

UNDUCTED PROPELLER TURBOSHAFT ENGINE PROVIDED WITH A REINFORCING SHELL INTEGRATING PIPE SEGMENTS

FIELD OF THE INVENTION

The present description relates to an aircraft turboshaft engine having an unducted propeller, commonly referred to as an "open-rotor" engine.

Such an invention is particularly useful for turboshaft engines in which the unducted propeller receiver is situated downstream from the gas generator. Furthermore it is particularly well adapted to the situation in which the turboshaft engine is suspended from the rear of the fuselage.

STATE OF THE PRIOR ART

In conventional manner, unducted propeller turboshaft engines or "open-rotor" engines, comprise firstly a two-spool gas generator that conventionally comprises from upstream to downstream: a low-pressure compressor; a high-pressure compressor; a combustion chamber; a high-pressure turbine; and an intermediate pressure turbine driving the low-pressure compressor. Such engines also comprise a propulsion receiver that comprises, from upstream to downstream: a free turbine for delivering power; a mechanical transmission device forming stepdown gearing; and a propulsion assembly provided with two contrarotating propellers that do not have any radially outer fairing, with each propeller being provided with a plurality of blades.

In such a turboshaft engine, the various modules of the gas generator are housed in different casings. Furthermore, such a turboshaft engine includes a large number of services of various kinds (fuel circuit, the hydraulic circuit, electrical distribution, air takeoffs, mechanical takeoffs, etc.): a dense and complex network of pipes and electric cables thus extends around the casings of the gas generator in order to connect together the various modules of the gas generator or indeed in order to connect the gas generator to the aircraft. Because of the large number of its components and because of its complexity, this network of services occupies a large volume around the casings: nevertheless, in early designs of "open-rotor" turboshaft engines, a large amount of space was available around those casings, so such a network did not present any real difficulty of integration.

However, the design of such turboshaft engines has subsequently progressed, and nowadays they present new members that are also integrated in the space extending around the casings of the gas generators, thereby leading to major difficulties of integration for the services network.

In particular, certain "open-rotor" turboshaft engines are provided with a reinforcing shell extending between two distinct casings of the turboshaft engine in order to reinforce its mechanical strength, in particular over certain portions of the gas generator that present a diameter that is small and that are thus more fragile. Such reinforcing shells are thus particularly effective in reducing distortion of the gas generator resulting from the large weight of the propulsion assembly that is cantilevered out therefrom.

Unfortunately, such reinforcing shells generally extend around and close to certain casings of the gas generator: the volume available between those casings and the reinforcing shell is then too small to receive all of the necessary services. Also, certain pipes are of diameters that are too great, or that require bends with radii of curvature that are too large, to enable them to be integrated between these casings and the reinforcing shell.

Documents GB 2 174 762 and FR 2 981 686 describe unducted propeller turboshaft engines. Document GB 2 114 661 describes a turboshaft engine in which a pipe passes through a casing wall.

Under such circumstances, there need to be passages for services through the reinforcing shell, which can weaken it and prevent it from being leakproof, where applicable. Also, a large number of services then need to pass outside of the reinforcing shell, thereby increasing the overall volume and the complexity of the network.

There therefore exists a real need for an unducted propeller turboshaft engine that suffers less or not at all from the above-mentioned drawbacks inherent to known turboshaft engines.

SUMMARY OF THE INVENTION

The present description relates to an unducted propeller turboshaft engine having a gas generator and a receiver including a propulsion assembly carrying at least one propeller, the engine including a first casing, a second casing, and a third casing, the third casing being provided between the first and second casings and surrounding at least a portion of the gas generator, a reinforcing shell presenting a first attachment zone mounted on the first casing, a second attachment zone mounted on the second casing, and a wall provided between the first and second attachment zones and surrounding the third casing, wherein the reinforcing shell further comprises at least one pipe segment integrated in said wall.

This invention is particularly suitable for turboshaft engines having two unducted contrarotating propellers, but it can also apply to turboshaft engines having a single propeller.

By means of such a reinforcing shell, it is possible to reinforce the mechanical strength of the turboshaft engine, particularly against twisting forces that result from the propulsion assembly being cantilevered out therefrom, while also facilitating integration of the services network around the gas generator.

In particular, because of the pipe segments integrated in the wall of the reinforcing shell, it is possible to obtain a configuration that is more compact. Specifically, pipes of section that is too large to be capable of passing between the wall and the third casing may be integrated in the wall itself, and thus very close to the third casing, instead of outside the wall. This also applies to pipes that require bends with radii of curvature that are large: if the radius of curvature makes this possible, segments of such pipes can thus be integrated in the wall, and thus close to the third casing, instead of outside the wall.

Also, because of these pipe segments integrated in the wall, the number of holes that are pierced through the wall is reduced: this serves to reinforce the stiffness and the mechanical strength of the reinforcing shell.

Since the number of holes is reduced, it is also possible to provide better leakproofing for the reinforcing shell, when that is desired. In particular, such an integrated pipe segment enables a service to pass through the reinforcing shell in sealed manner without piercing the wall: specifically, the pipe can join the wall via its inside face, run a certain distance in integrated manner inside the wall, and then leave the wall via its outside face.

In the present description, a pipe segment is said to be "integrated" in the wall when, locally, the pipe segment lies between the inner and outer surfaces of the wall. Under such circumstances, a first wall portion of the pipe segment may locally constitute an internal portion of the shell wall and/or a second wall portion of the pipe segment may locally constitute an outer portion of the shell wall. In particular, the distance between the inner and outer surfaces of the shell wall may increase locally in order to accommodate the pipe segment: there is thus no need for the diameter of the pipe to be less than the mean thickness of the shell wall. The pipe segment may thus project from both faces of the remainder of the wall: a portion of the integrated pipe can thus project into the inside space and/or into the outside space defined by the reinforcing shell.

Also, in the present description, the terms "axial", "radial", "tangential", "inner", "outer", and their derivatives are defined relative to the main axis of the turboshaft engine; furthermore, the terms "upstream" and "downstream" are defined relative to the flow of air through the turboshaft engine.

In certain embodiments, said pipe segment is substantially centered relative to the wall in the thickness direction of the wall. By means of this element of symmetry, the mechanical strength of the wall, and thus of the reinforcing shell, is reinforced.

In certain embodiments, the turboshaft engine further comprises a suspension structure mounted between the first and second casings and configured to be connected to an aircraft. This suspension structure enables the turboshaft engine to be fastened to the aircraft. It is preferable for the suspension structure to be mounted on the same casings as the reinforcing shell in order to reinforce more effectively the mechanical strength of the engine.

In certain embodiments, the turboshaft engine comprises an intermediate casing provided between a first compressor and a second compressor of the gas generator, and the first casing is the intermediate casing. This configuration is preferable since the intermediate casing is generally a structural casing possessing good mechanical strength. In particular, it comes before a portion of the engine that is of smaller section and thus less suitable for withstanding mechanical forces. Furthermore, it is generally a casing that enables the engine to be fastened to the aircraft.

In certain embodiments, the turboshaft engine includes a static frame casing that is provided between a free turbine of the receiver and the propulsion assembly, and the second casing is the static frame casing. This configuration is preferable since the static frame casing is generally a structural casing possessing good mechanical strength. In particular, it comes after a portion of the engine that is of smaller section and thus less suitable for withstanding mechanical forces. Furthermore, it is situated immediately upstream from the propulsion assembly, which is the heaviest portion of the engine, in particular because of the propellers: under such circumstances, in order to limit the large cantilever forces caused by the propulsion assembly, it is generally a casing that enables the engine to be fastened to the aircraft.

In certain embodiments, the second attachment zone of the reinforcing shell is flexibly mounted on the second casing.

In certain embodiments, the second attachment zone of the reinforcing shell is mounted on the second casino by means of at least one link. The link is preferably oriented in an axial plane; it may be hinged by means of a ball joint.

In certain embodiments, the first attachment zone of the reinforcing shell is mounted on the first casing in stationary manner.

In certain embodiments, the wall also surrounds a casing surrounding a free turbine of the receiver. Such a free turbine also requires certain services that encounter integration problems analogous to those of the gas generator: certain pipes dedicated to the free turbine can thus likewise be integrated, at least in part, in the wall.

In certain embodiments, the turboshaft engine further comprises a ventilation system configured to generate a flow of air in the space between the wall of the reinforcing shell and the third casing. This flow of air may be taken in particular upstream from the combustion chamber, e.g. between the first and second compressors of the gas generator, for the purpose of cooling the space between the third casing and the reinforcing shell; it may also cool the portion of the gas generator that is surrounded by the third casing. This flow of air, once heated in this way, can then be recovered in order to provide a source of heat, e.g. for the purpose of deicing the pylon of the aircraft. Thus, integrating pipe segments in the wall makes it possible to ensure that the wall is leakproof relative to this flow of air.

In certain embodiments, the wall of the reinforcing shell includes at least one through sealed connection configured to pass a service or a piece of equipment of the turboshaft engine through the reinforcing shell in sealed manner. This sealed connection is preferably hinged in order to allow for relative movement between said equipment and the wall.

In certain embodiments, the wall of the reinforcing shell is substantially a body of revolution. This enables its structural function to be performed in uniform manner all around the gas generator.

In certain embodiments, the wall of the reinforcing shell is substantially frustoconical. This reinforces is mechanical strength against the forces passing between the first and second casings.

In certain embodiments, the reinforcing shell includes at least one reinforcing structure suitable stiffening the wall of the reinforcing shell.

In certain embodiments, the reinforcing shell includes at least one reinforcing beam extending longitudinally along the wall of the reinforcing shell.

In certain embodiments, the reinforcing shell includes at least one reinforcing beam extending tangentially around the wall of the reinforcing shell.

The above-described characteristics and advantages, and others, appear on reading the following detailed description of embodiments of the proposed turboshaft engine. The detailed description refers to the accompanying drawings.

BRIEF DESCRIPTION OF THE DRAWINGS

The accompanying drawings are diagrammatic and seek above all to illustrate the principles of the invention.

In the drawings, from one figure to another, elements (or portions of an element) that are identical are given the same reference signs.

DETAILED DESCRIPTION OF EMBODIMENT(S)

In order to make the invention more concrete, an embodiment of a turboshaft engine is described in detail below with reference to the accompanying drawings. It should be recalled that the invention is not limited to this embodiment.

Figure 1:
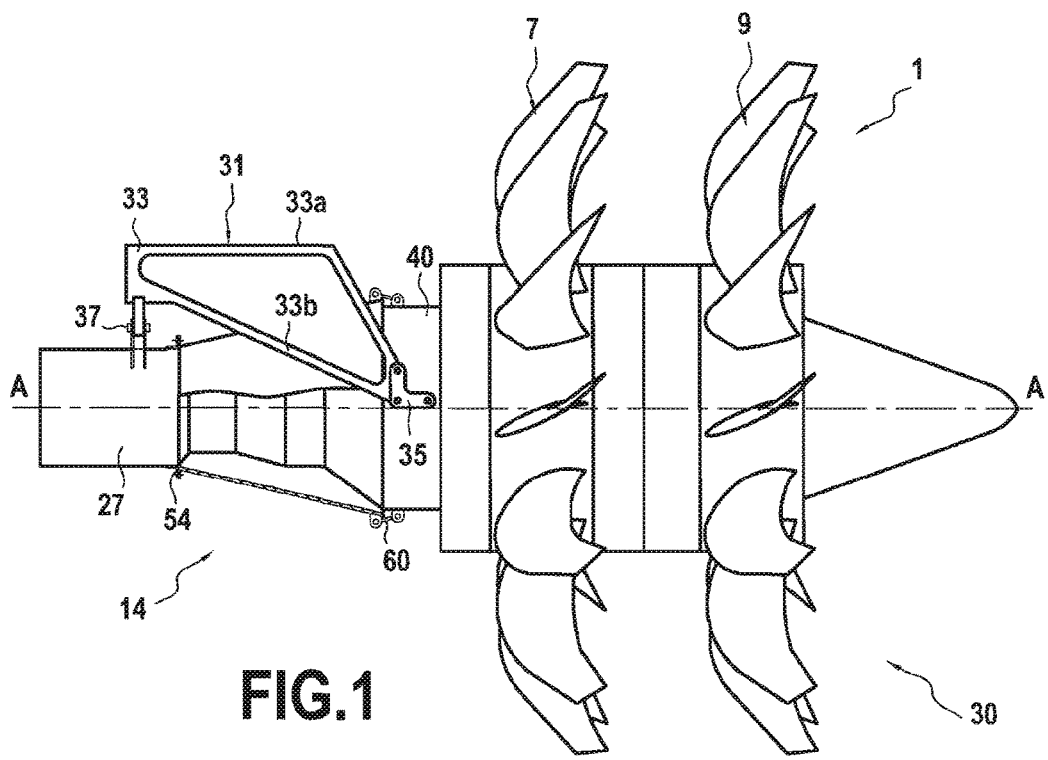
FIG. 1 is an overall view of a turboshaft engine of the invention.
Figure 2:
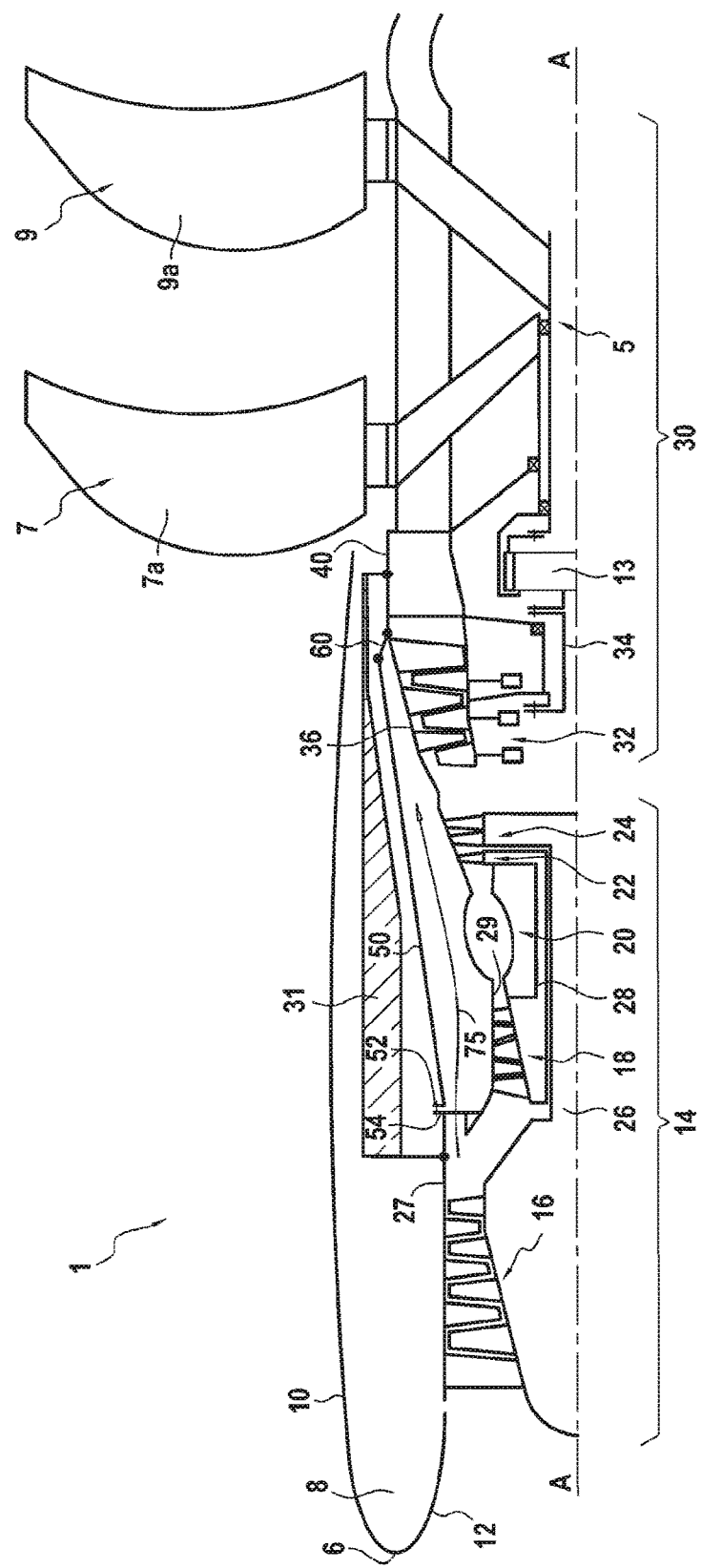
FIG. 2 is an elevation view in section of such a turboshaft engine.

FIG. 1 shows a turboshaft engine 1 of the open rotor type in a preferred embodiment of the present invention. FIG. 2 is a diagrammatic view of the same engine 1 in a longitudinal section view. In these figures, the direction A corresponds to the longitudinal axis of the engine 1.

In its front portion, the engine 1 has an air inlet 6 that is extended rearwards by a nacelle 8 generally comprising an outer skin 10 and an inner skin 12, the two skins being centered on the axis A and being radially spaced apart from each other.

The inner skin 12 forms an outer radial casing for a gas generator 14 comprising in conventional manner, from upstream to downstream: a low-pressure compressor 16; a high-pressure compressor 18; a combustion chamber 20; a high-pressure turbine 22; and an intermediate pressure turbine 24. The low-pressure turbine 16 and the intermediate pressure turbine 24 are mechanically connected together by a shaft 26, thus forming a low-pressure spool, while the high-pressure compressor 18 and the high-pressure turbine 22 are mechanically connected together by a shaft 28, thus forming a higher-pressure spool.

Consequently, the gas generator 14 is of conventional design, known as a two-spool design, in which the compressors 16 and 18 are separated by an intermediate casing 27, which forms a major structural element of the engine 1. The high-pressure compressor 18, the combustion chamber 20, and the high and intermediate pressure turbines 22 and 24 are surrounded by a gas generator casing 29 having its upstream end connected to the intermediate casing 27.

Downstream from the intermediate pressure turbine 24, there is a receiver 30 of unducted propellers, the receiver 30 forming the propulsion element of the engine 1.

At its upstream end, the receiver 30 has a free turbine 32 for delivering power. This turbine 32 has a rotor 34 mechanically connected to a mechanical transmission device 13 forming stepdown gearing, e.g. comprising an epicyclic gear train. Its stator portion comprises an outer casing 36 that is connected at its upstream end to the downstream end of the gas generator casing 29.

Furthermore, downstream from the free turbine 32, the receiver 30 integrates a propulsion assembly 5 comprising a first or upstream propeller 7 having blades 7a, and a second or downstream propeller 9 having blades 9a. The propellers 7 and 9 are thus offset from each other in the longitudinal direction A of the engine 1, and they are both situated downstream from the free turbine 32.

The two propellers 7, 9 are designed to rotate in opposite directions about the axis A on which they are centered. These two propellers 7, 9, which do not have any radially outer fairing surrounding them, are driven by means of a mechanical transmission device 13 to which they are connected.

It should also be observed that the outer casing 36 is followed downstream by a static frame casing 40 separating the free turbine 32 from the propulsion assembly 5, and forming a major structural element of the engine 1.

The engine 1 also has a suspension structure 31 enabling it to be attached to a pylon of the aircraft. A preferred example of such a suspension structure is described in the French patent application filed under the number 13/53872. Such a suspension structure comprises a cradle 33 formed by a main beam (or spar) 33a and by two lateral beams 33b connected to the main beam 33a, these lateral beams 33b each being triangular in shape, for example. The cradle 33 thus forms a V-shaped structure.

This suspension structure has respective brackets 35 connecting each of the free ends of the lateral beams 33b to the static frame casing 40 of the engine 1. The suspension structure 31 also has at least one transverse link 37 connecting one of the lateral beams 33b of the cradle 33 to the intermediate casing 27 of the engine 1.

Given this suspension of the engine 1 between the intermediate casing 27 and the static frame structure 40, the propulsion assembly 5 is cantilevered out at the downstream end of the engine 1. This cantilevered configuration generates forces that can distort the engine.

In order to enable the forces to be transmitted better, the engine 1 has a reinforcing shell 50 extending in centered manner around the axis A between the intermediate casing 27 and the static frame casing 40.

At its upstream end, the reinforcing shell 50 has a first attachment zone that is fastened to the intermediate casing 27 via fastener flanges 52, 54 that are provided respectively on the shell 50 and on the intermediate casing 27. The flanges 52 and 54 are fastened together conventionally by bolts.

At its downstream end, the reinforcing shell 50 has a second attachment zone that is fastened to the static frame casing 40 by a plurality of links 60 that are circumferentially distributed around the axis A. Each link 60 preferably lies in a plane including the axis A, while also being slightly inclined relative to the vertical direction in such a manner that its radially inner end is offset downstream relative to its radially outer end. In order to facilitate relative movements between the reinforcing shell 50 and the engine 1 in all three of the axial, radial, and tangential directions, the links 60 are mounted at their ends via ball joint connections.

Figure 3:
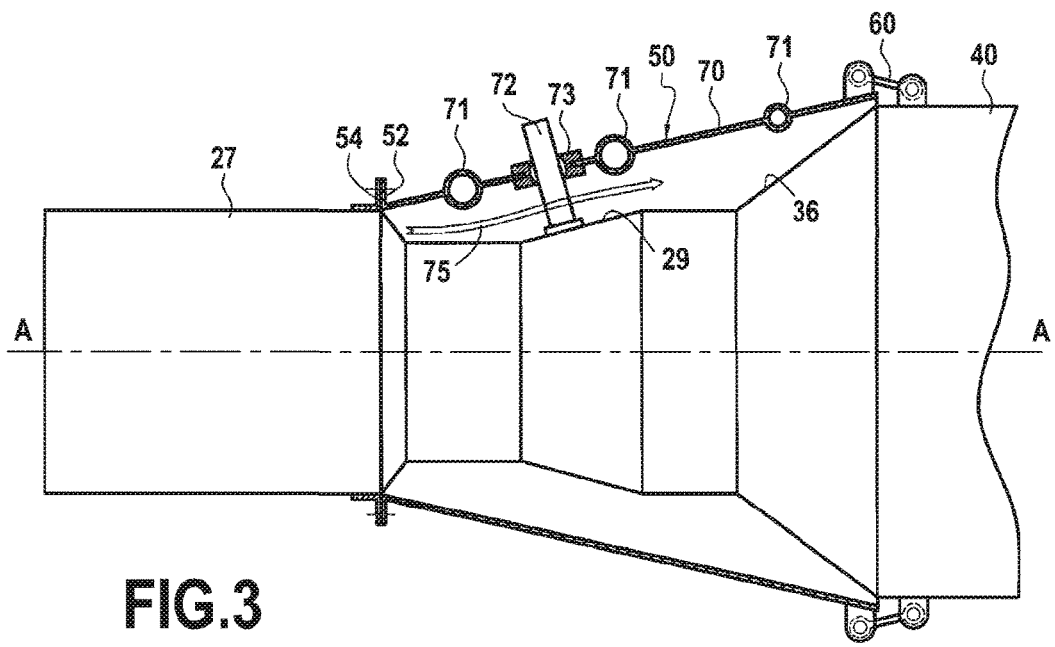
FIG. 3 is a section view of the reinforcing shell zone.

FIG. 3 shows the reinforcing shell 50 in greater detail. It should be observed that the shell comprises a wall 70 extending between the fastener flanges 52 and the attachment zone having the links 60. This wall 70 is substantially frustoconical and it thus extends all around the gas generator casing 29 and the outer casing 36 of the free turbine 32. The wall 60 may be made in particular out of metal, comprising one or more parts, or indeed it may be made out of composite material.

This wall 70 is preferably leakproof, which enables a flow of air 75 to be established between the casings 29 and 36 and the wall 70 of the reinforcing shell 50. As can be seen in FIG. 1, such an air flow 75 may be taken from a bleed connection provided in the intermediate casing 27: this air, which is cold, then serves to cool the hot portions of the gas generator 14 situated under the casing 29. This air flow 75, once heated in this way, can be recovered, e.g. from the gap between the wall 70 of the static frame casing 40 between the links 60 in order to deice the pylon of the aircraft on which the engine 1 is mounted.

At a plurality of locations, the wall 70 integrates pipe segments 71. Such integrated pipe segments 71 may be designed in various ways. In a first example, the wall 70 comprises an inner first skin and an outer second skin that are assembled together coaxially: under such circumstances, the inner and/or outer skins may include cavities that form respective integrated pipe segments 71 once the two skins have been assembled together. The inner and outer skins may also include cavities that coincide so as to form pipe segments 71 of greater section that are symmetrical and centered relative to the wall 70 in its thickness direction.

In another example, the wall 71 may comprise a frustoconical skin, possibly having cavities, that extends between the fastener flanges 52 and the links 60, together with a plurality of blisters, which may also include cavities, that are fitted against said skin, in particular over its cavities, so as to form integrated pipe segments 71.

In yet another example, cavities are created within the wall at the time that it is fabricated, e.g. using a suitable mold, thereby forming pipe segments 71 that are integrated in the wall 70. For this purpose, it is possible in particular to use a method of the super plastic forming-diffusion bonding (SPF-DB) type. This method, which is well known to the person skilled in the art, consists in placing to metal sheets one against the other while protecting certain zones by means of a protective material that is sandwiched between them. In an oven, the nonprotected zones weld together and air is injected in order to create cavities in the protected zones.

In a last example, the wall 70 may comprise a skin having elongate openings in which tube segments are fitted, thereby forming pipe segments 71 integrated in the wall 70. The pipes may be attached by welding or brazing, or indeed they may be fastened by using supports such as collars, flanges, or P-shaped clamps (P-clamps).

Naturally, the person skilled in the art can devise other examples of methods of designing such pipe segments.

These pipe segments 71 serve to pass services or equipment of the engine 1 for the purpose of connecting together the various modules of the engine 1 or of connecting certain modules of the engine to the outside, and in particular to the aircraft.

The engine 1 may also include other pipes 72, e.g. for other services, that extend substantially radially from the gas generator casing 29 or from the outer casing 36 of the free turbine, passing substantially perpendicularly through the wall 70 of the reinforcing shell 50 in order to go to a remote module or to the outside of the engine 1. Under such circumstances, the wall 70 is provided with a sealed through connection 73, e.g. in the form of a sealed ball joint, so as to enable such a pipe 72 to pass through the reinforcing shell 50 without interrupting the leak-proofing of the wall 70, and while still accommodating a certain amount of relative movement between the pipe 72 and the wall 70.

Naturally, other services of various kinds can also run along the inside space provided between the reinforcing shell 50 and the casing 29, 36 or indeed can extend along and outside the reinforcing shell 50: such services, which are conventional, are not shown in order to avoid pointlessly complicating the drawings.

The embodiments described in the present description are given by way of nonlimiting illustration, and in the light of this description, the person skilled in the art can easily modify these embodiments or can envisage others, while remaining within the scope of the invention.

Furthermore, the various characteristics of these embodiments may be used singly or in combination with one another. When they are combined, these characteristics may be combined as described above or in other ways, the invention not being limited to the specific combinations described in the present description. In particular, unless specified to the contrary, a characteristic described with reference to one particular embodiment may be applied in analogous manner to another embodiment.

The invention claimed is:

1. A turboshaft engine having a gas generator and a receiver including a propulsion assembly carrying at least one propeller, the engine including a first casing, a second casing, and a third casing, the third casing being provided between the first and second casings and surrounding at least a portion of the gas generator;
   a reinforcing shell presenting a first attachment zone mounted on the first casing, a second attachment zone mounted on the second casing, and a wall provided between the first and second attachment zones and surrounding the third casing;
   wherein the reinforcing shell further comprises a pipe segment integrated in said wall, said pipe segment locally lying between the inner and outer surfaces of said wall,
   and wherein at least one of a first wall portion of the pipe segment locally constitutes an internal portion of the wall and a second wall portion of the pipe segment locally constitutes an outer portion of the wall,
   wherein the pipe segment is arranged in a circumferential direction of the turboshaft engine.

2. The turboshaft engine according to claim 1, wherein said pipe segment is substantially centered relative to the wall in the thickness direction of the wall.

3. The turboshaft engine according to claim 1, further comprising a suspension structure mounted between the first and second casings and configured to be connected to an aircraft.

4. The turboshaft engine according to claim 1, comprising an intermediate casing provided between a first compressor and a second compressor of the gas generator; and
   wherein the first casing is the intermediate casing.

5. The turboshaft engine according to claim 1, comprising a static frame casing provided between a free turbine of the receiver and the propulsion assembly; and
   wherein the second casing is the static frame casing.

6. The turboshaft engine according to claim 1, wherein the wall also surrounds a casing surrounding a free turbine of the receiver.

7. The turboshaft engine according to claim 1, further comprising a ventilation system configured to generate a flow of air in the space between the wall of the reinforcing shell and the third casing.

8. The turboshaft engine according to claim 1, wherein the wall of the reinforcing shell is substantially a body of revolution.

9. The turboshaft engine according to claim 1, wherein the wall of the reinforcing shell is substantially frustoconical.

* * * * *